3,836,570
m-AMIDOPHENYLCARBAMATES
Karoly Szabo, Syracuse, N.Y., assignor to Stauffer
Chemical Company, New York, N.Y.
No Drawing. Continuation-in-part of application Ser. No.
719,698, Apr. 8, 1968, which is a continuation-in-part
of applications Ser. No. 484,421, Sept. 1, 1965, Ser.
No. 574,805, Aug. 24, 1966, and Ser. No. 676,638,
Oct. 19, 1967, all now abandoned, which in turn is
a division and continuation-in-part of application Ser.
No. 517,886, Dec. 27, 1965, now Patent No. 3,399,265.
This application Aug. 28, 1968, Ser. No. 755,772
Int. Cl. C07c 125/06
U.S. Cl. 260—471 C          15 Claims

ABSTRACT OF THE DISCLOSURE m-Amidophenylcarbamates having the general formula

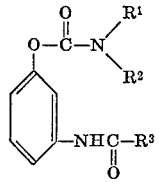

in which $R^1$ is hydrogen and lower alkyl containing from one to five carbon atoms; $R^2$ is alkyl containing from one to eight carbon atoms, cyclohexyl, lower alkenyl containing from three to four carbon atoms, phenyl and substituted phenyl in which the substituents are lower alkyl, lower alkoxy, nitro and halogen; and $R^3$ is an alkyl group containing one to six carbon atoms, inclusive. The compounds are effective in the control of grasses and broadleaf plants with both pre-emergence and post-emergence activity. The compounds in which $R^1$ is hydrogen, $R^2$ is methyl and $R^3$ is alkyl are especially active as insecticides. Representative compounds are: 3-(N-isopropylcarbamoyloxy)-propionanilide, 3 - (N-butylcarbamoyloxy)-propionanilide, m-(N-methylcarbamoyloxy) acetanilide, m-(N-methyl carbamoyloxy) propionanilide and m-(N-methylcarbamoyloxy)-n-butylanilide.

---

This application is a continuation-in-part of copending application, Ser. No. 719,698, filed Apr. 8, 1968, now abandoned, which in turn is a continuation-in-part of copending applications: Ser. No. 484,421, filed Sept. 1, 1965, now abandoned; Ser. No. 574,805, filed Aug. 24, 1966, now abandoned; and Ser. No. 676,638, filed Oct. 19, 1967, now abandoned; and which is a divisional and continuation-in-part of copending application Ser. No. 517,-886, filed Dec. 27, 1965, now U.S. Pat. 3,399,265.

This invention relates to certain novel *meta*-amidophenyl carbamates and their utility as effective herbicides and insecticides.

The compounds comprising the instant invention have the following general formula:

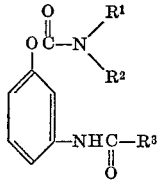

wherein $R^1$ is selected from the group consisting of hydrogen, and lower alkyl, preferably containing from one to five carbon atoms; $R^2$ is selected from the group consisting of alkyl, preferably, containing from one to eight carbon atoms, cyclohexyl, lower alkenyl, preferably containing from three to four carbon atoms, phenyl, and substituted phenyl wherein said substituents are selected from lower alkyl, lower alkoxy, nitro, and halogen; and $R^3$ is an alkyl group, preferably containing one to six carbon atoms. The lower alkyl and alkyl groups correspondingly represented by $R^1$, $R^2$, and $R^3$ are either branched or straight chain. Examples of lower alkyl and alkyl groups are methyl, ethyl, n-propyl, iso-propyl, n-butyl, sec-butyl, n-hexyl, iso-amyl, n-heptyl, iso-octyl and the like. Examples of lower alkenyl preferably includes those members of the group containing at least one double bond and from 3 to 4 carbon atoms, such as allyl, 2-butenyl, 3-butenyl and the like. The term halogen preferably includes fluorine, chlorine, bromine and iodine.

The compounds herein disclosed are prepared by one of several methods. When $R_1$ is hydrogen and $R_2$ is alkyl, cyclohexyl, lower alkenyl, phenyl, substituted phenyl wherein said substituents are lower alkyl, lower alkoxy, nitro or halogen, a convenient method applicable to preparing the compounds is the reaction between an appropriate substituted-*m*-amido phenol and an appropriate isocyanate. An organic solvent, e.g. chloroform, methylene chloride, ether, dioxane or acetone, can be employed as a reaction medium. Acetone and homologous ketones are found to be particularly convenient when the *m*-hydroxy alkylanilides are used because such anilides are more soluble in these solvents than in other less polar inert solvents. A tertiary amine, preferably triethylamine, is used in catalytic amounts to promote the reaction. Reaction temperatures are employed that permit operation in the liquid phase. Said reaction temperatures are between room temperature and reflux temperature of the solvent, if any is used. When $R_1$ is alkyl and $R_2$ is alkyl, cyclohexyl, lower alkenyl, phenyl, substituted phenyl wherein said substituents are lower alkyl, lower alkoxy, nitro or halogen, one convenient method applicable for preparing the compounds is the reaction of an appropriately substituted carbamyl chloride and a 3'-hydroxy-anilide. Further, the preparation of either type of compound, i.e. wherein $R^1$ is hydrogen or wherein $R^1$ is alkyl and $R^2$ is as described above, is conveniently carried out employing an appropriate amidophenyl chloroformate of the formula

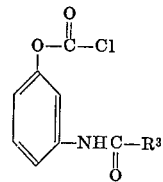

and, either a primary or secondary amine, e.g. the formula

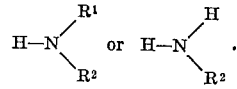

These latter reactions employing a carbamyl chloride or a chloroformate are preferably carried out in the presence of a hydrogen halide acceptor, such as triethylamine, or an excess of an amine starting material, pyridine, picoline, sodium carbonate, potassium carbonate and the like. Temperatures which are employed in these reactions permit operation in a liquid phase and are between about 0° C. and reflux temperature of the solvent, if one is used.

It is noted that all of the compounds of the present invention are *meta*-substituted phenyl carbamates. In contrast the instant compounds are readily distinguished from the *para*-substituted amidophenylcarbamates taught in U.S. Pat. 3,037,993 and Canadian Pat. No. 554,576. The *meta*-substituted compounds of the present invention exhibit unexpected superiority over the known compounds, both as herbicides and insecticides. It should be noted that while general herbicidal activity has been discovered within the scope of compounds of the present invention, only the N-methyl carbamoyloxy compounds show substantial activity as insecticides. The herbicidal activity includes effectiveness in the control of grasses and broadleaf plants with both pre-emergence and post-emergence activity.

Compounds of the present invention are made in accordance with the following illustrative examples.

EXAMPLE I

Preparation of m-(N-methylcarbamoyloxy) acetanilide

In 150 ml. of chloroform, as a solvent, were brought together 15.2 g. of m-hydroxyacetanilide and 6.0 g. methyl isocyanate. To this solution was added 0.3 ml. of triethylamine and a trace of dibutyl tin dilaurate as catalysts. The mixture was refluxed and stirred for one hour. A solid product formed during this period. The solid was separated by filtration. There was obtained 19.2 g. (93.6 percent yield) of the title compound, m.p. 155–7° C.

The homologs: m-(N-methylcarbamoyloxy)isobutyranilide, m.p. 153° C. and m-(N-methylcarbamoyloxy)-n-butyranilide, m.p. 176–7° C., were prepared in analogous reactions.

EXAMPLE II

Preparation of m-(N-methylcarbamoyloxy)propionanilide

In 250 ml. acetone in a round bottom flask equipped with a stirrer, reflux condenser and dropping funnel was dissolved m-hydroxypropionanilide (66 g.). To this solution was added 1 ml. of triethylamine. Methyl isocyanate (23 g.) was added gradually with good agitation of the reactants. The precipitation of the product indicated that the reaction was proceeding satisfactorily. When all the isocyanate was added, the mixture was refluxed for 20 minutes, then cooled to room temperature and the white solid product recovered by filtration. There was obtained 86 g. (97.8% yield) of the title compound, m.p. 153–4° C.

EXAMPLE III

Preparation of m-(N-isopropylcarbamoyloxy) propionanilide

In 60 ml. acetone in a round bottom flask equipped with a stirrer, reflux condenser and dropping funnel is dissolved m-hydroxy-propionanilide (3.3 g.). To this solution is added 0.4 ml. of triethylamine. Isopropyl isocyanate (3 g.) is added gradually with good agitation of the reactants. The precipitation of the product indicates that the reaction is proceeding satisfactorily. When all the isocyanate is added, the mixture is refluxed for 20 minutes, then cooled to room temperature and allowed to stand overnight. A white solid product is recovered by filtration. There is obtained 4.1 g. of the title compound, m.p. 198–9° C.

EXAMPLE IV

Preparation of N,N-dipropylcarbamoyloxy propionanilide

Sixteen and five-tenths grams ((0.1 mole) of 3'-hydroxy propionanilide was refluxed with 16.3 g. of di-n-propylcarbamyl chloride and 28 g. of powdered potassium carbonate in 120 ml. of acetone for four hours. The mixture was cooled to room temperature and poured into water, taken up in ether, separated, and washed with water, dried over anhydrous magnesium sulfate and stripped under vacuum. There was obtained a pale yellow oil which slowly crystallized overnight. Yield of the crude product was 27.5 g., m.p. 51–59° C. A sample washed with cyclohexane had a m.p. of 55–60° C. The infrared spectrum was satisfactory.

EXAMPLE V

Preparation of 3-propionamidophenyl chloroformate

A solution of 10.1 g. (0.1 mole) of phosgene in 25.9 g. of toluene was prepared and 25.6 g. of this solution was added to 100 ml. of toluene, and 16.5 g. (0.1 mole) of 3'-hydroxy propionanilide was added and dispersed. Triethyl amine 10.1 g. (0.1 mole) was added dropwise and a mildly exothermic reaction resulted. The temperature was kept under 30° C., with cooling in a water bath. After approximately 70 percent of the triethyl amine was added the remaining phosgene solution was added all at once. The addition of triethyl amine was continued. When addition was complete, about 10 ml. of acetone was added and a nearly homogenous yellow solution resulted. It was filtered to remove about 4 g. of starting material and evaporated to a viscous yellow liquid. There was obtained 18.8 g. of the title compound, $n_D^{22}$ 1.5437. Calculated for $C_{10}H_{10}O_3NCl$: $Cl=15.67\%$; found 15.43%.

Preparation of m-(N-t-butylcarbamoyloxy) propionanilide

Eighteen and two-tenths grams of 3-propionamidophenyl chloroformate in methylene chloride solution (0.08 mole) was cooled to 0° C. and t-butylamine 24.2 g. (0.16 mole) was added with gentle shaking. A very exothermic reaction took place. The flask was cooled in an icebath and after 5 minutes it solidified. The product was treated with 70 ml. of benzene and 50 ml. of cold water was added with stirring. The mixture was filtered and the filter cake was washed with cold water. A nearly white solid was obtained, m.p. 158–160° C. The product was totally recrystallized four times from ethyl acetate. There was obtained 2.5 g. of the title compound, m.p. 210–212° C.

Similarly prepared were m-(N-sec-butyl carbamoyloxy) propionanilide and m - (N-isobutylcarbamoyloxy) propionanilide.

The following is a table of the compounds which are prepared according to the aforedescribed procedures. Compound numbers have been assigned to them and are substituted for identification throughout the balance of the specification.

TABLE I

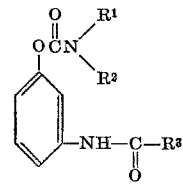

| Compound No. | R¹ | R² | R³ | M.p. (° C.) or $n_D^{30}$ |
|---|---|---|---|---|
| 1 | H | i-Propyl | Ethyl | 198–199 |
| 2 | H | n-Butyl | do | 130–133 |
| 3 | H | Cyclohexyl | do | 156–159 |
| 4 | Ethyl | Ethyl | do | 77–78 |
| 5 | H | Phenyl | do | 155 |
| 6 | H | i-Propyl | i-Propyl | 227–228 |
| 7 | H | Ethyl | Ethyl | 161–166 |
| 8 | H | Octyl | do | 138 |
| 9 | n-Propyl | n-Propyl | do | 55–59 |
| 10 | n-Butyl | n-Butyl | do | 68–69 |
| 11 | i-Butyl | i-Butyl | do | 90 |
| 12 | H | n-Propyl | do | 150–153 |
| 13 | H | 2-Me-phenyl | do | 148–150 |
| 14 | H | 3-Me-phenyl | do | 143–144 |
| 15 | H | 4-Me-phenyl | do | 177–178 |
| 16 | H | 2-Cl-phenyl | do | 129 |
| 17 | H | 3-Cl-phenyl | do | 160–162 |
| 18 | H | 4-Cl-phenyl | do | 192–194 |
| 19 | H | 3,4-dichlorophenyl | do | 185–188 |
| 20 | H | 2,5-dichlorophenyl | do | 138–141 |
| 21 | H | 4-Br-phenyl | do | 199–201 |
| 22 | H | 3-NO₂-phenyl | do | 174–176 |
| 23 | H | 2-ethoxyphenyl | do | 122–124 |
| 24 | H | 4-ethoxyphenyl | do | 170–174 |
| 25 | H | sec-Butyl | do | 186–188 |
| 26 | H | iso-Butyl | do | 173–175 |
| 27 | H | t-Butyl | do | 210–213 |
| 28 | H | Allyl | do | 136–142 |
| 29 | H | do | i-Propyl | 163–169 |
| 30 | H | Ethyl | do | 164–168 |

TABLE I—Continued

| Compound No. | R¹ | R² | R³ | M.p. (° C.) or $n_D^{30}$ |
|---|---|---|---|---|
| 31 | H | Allyl | Methyl | 136–141 |
| 32 | H | i-Propyl | do | 163–166 |
| 33 | H | do | i-Propyl | 200–206 |
| 34 | H | n-Propyl | Methyl | 126–132 |
| 35 | H | do | i-Propyl | 168–172 |
| 36 | H | n-butyl | Methyl | 116–120 |
| 37 | H | do | i-Propyl | 153 |
| 38 | H | Phenyl | Methyl | 170–173 |
| 39 | H | do | i-Propyl | 170–177 |
| 40 | H | Cyclohexyl | Methyl | 168–173 |
| 41 | H | Ethyl | t-Butyl | 186–188 |
| 42 | H | n-Propyl | do | 179–181 |
| 43 | H | i-Propyl | do | 179–181 |
| 44 | H | Allyl | do | 171–173 |
| 45 | H | n-Butyl | do | 160–162 |
| 46 | H | Ethyl | n-Butyl | 135–317 |
| 47 | H | do | Pentyl | 130–133 |
| 48 | H | n-Propyl | n-Butyl | 134–139 |
| 49 | H | do | Pentyl | 133–136 |
| 50 | H | i-Propyl | n-Butyl | 144–150 |
| 51 | H | Allyl | do | 131–134 |
| 52 | H | do | Pentyl | 132–135 |
| 53 | H | n-Propyl | n-Propyl | 155–156 |
| 54 | H | Allyl | do | 137–139 |
| 55 | H | n-Butyl | do | 145–146 |
| 56 | H | Cyclohexyl | do | 179–181 |
| 57 | H | n-Butyl | sec-Butyl | 151–152 |
| 58 | H | Ethyl | 1-methylbutyl | 150–152 |
| 59 | H | n-Propyl | do | 152–153 |
| 60 | H | Allyl | do | 142–143 |
| 61 | H | Ethyl | 1,1-dimethylbutyl | 135–137 |
| 62 | H | i-Propyl | do | 128–130 |
| 63 | H | Allyl | do | 126–128 |
| 64 | Ethyl | Ethyl | 1-methylbutyl | 1.5114 |
| 65 | H | t-Butyl | do | 139–141 |
| 66 | H | do | 1,1-dimethylbutyl | (solid) |
| 67 | Ethyl | Ethyl | sec-Butyl | 1.5180 |
| 68 | do | do | i-Propyl | 1.5098 |
| 69 | H | i-Propyl | 1-methylbutyl | 160–162 |
| 70 | H | n-Butyl | do | 141–142 |
| 71 | H | Methyl | Methyl | 155–157 |
| 72 | H | do | Ethyl | 153–154 |
| 73 | H | do | i-Propyl | 153 |
| 74 | H | do | n-Propyl | 176–177 |
| 75 | H | t-Butyl | Methyl | 168 |
| 76 | H | Methyl | s-Butyl | 150–152 |
| 77 | H | Ethyl | do | 162–164 |
| 78 | H | t-Butyl | do | 140–144 |

Pre-emergence Herbicide Screening Test

Fifty mg. of the compound to be tested are weighed out. The compound is placed in a bottle and 3 ml. of acetone containing 1% Tween 20® (polyoxy-ethylene sorbitan monolaurate) are added to dissolve the compound. If the material is not soluble in acetone, another solvent such as water, alcohol or dimethylformamide (DMF) is used instead. When DMF is used, only 0.5 ml. or less is used to dissolve the compound and then another solvent is used to make the volume up to 3 ml. One day after planting weed seeds in the flat of soil, the 3 ml. of solution was sprayed uniformly on the soil contained in a small flat. An atomizer is used to apply the spray. The rate of application is 20 lb./acre and the spray volume is 143 gal./acre.

On the day preceding treatment, the flat is filled to a depth of 2 inches with a sandy loam soil. Seeds of seven different weed species are planted in individual rows, using one species per row across the width of the flat. The seeds are covered with soil so that they are planted at a depth of 0.5 inch. The seeds used are hairy crabgrass (*Digitaria sanguinalis*), green foxtail (*Setaria viridis*), watergrass (*Echinochloa crusgalli*), wild oat (*Avene fatua*), redroot pigweed (*Amaranthus retroflexus*) (L.), Indian mustard (*Brassica juncea* (L.) Coss.) and curly dock (*Rumex crispus* (L.)). Ample seeds are planted to give about 20 to 50 seedlings per row after emergence depending on the size of the plants. (Usually 30 to 50 flats are planted and treated the same day.)

After treatment, the flats are placed in the greenhouse at a temperature of 70 to 85° F. About two weeks after treatment, the degree of injury or control is determined by comparison with untreated check plants of the same age and recorded. The rating system is as follows:

−=no significant injury (0 to 15% control)
+=slight injury (25 to 35% control)
++=moderate injury (55 to 65% control)
+++=severe injury or death (85 to 100% control).

An activity index is used to represent the total activity on all seven weed species. It is simply the sum of the number of plus marks, so that an activity index of 21 represents complete control of all seven weeds.

Post-emergence Herbicide Screening Test

Seeds of five weed species (hairy crabgrass, watergrass, wild oat, Indian mustard and curly dock) and one crop, pinto beans (*Phaseolus vulgaris*) are planted in flats as described above for pre-emergence screening. The flats are placed in the greenhouse at 70 to 85° F. and watered daily with a sprinkler. About 10 to 14 days after planting, when the primary leaves of the bean plants are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be 20 lb./acre if all of the spray were retained on the plants and the soil, but some spray is lost so it is estimated that the application rate is 12.5 lb./acre. The spray volume is 475 gal./acre.

Beans are used to detect defoliants and plant growth regulators. The beans are thinned to 2 or 3 plants per flat by cutting off the excess weaker plants several days before treatment. The treated plants are placed back in the greenhouse and care is taken to avoid sprinkling the treated foliage with water for 3 days after treatment. Water is applied to the soil from a slow stream of water at the end of a hose taking care not to wet the foliage.

Injury ratings are recorded about 14 days after treatment. The rating system is the same as described above for the pre-emergence test where −, +, ++ and +++ are used for the different degrees of injury and control. The injury symptoms are also the same as listed above for the pre-emergence test, except that IG (inhabited germination) is not used since the seeds have already germinated before treatment in the post-emergence screening test.

The maximum activity index for complete control of all species in the post-emergence screening test is 18 which represents the sum of all the plus marks obtained with the six plant species used in the test. The herbicides activity indices are presented in Table II.

TABLE II

| Compound number | Herbicidal activity screening results | |
|---|---|---|
| | Pre-emergence (20 lb./a.) | Post-emergence (12.5 lb./a.) |
| 1 | 17 | 18 |
| 2 | 17 | 18 |
| 3 | 16 | 18 |
| 4 | 20 | 18 |
| 5 | 10 | 17 |
| 6 | 5 | 13 |
| 7 | 19 | 18 |
| 8 | 3 | 4 |
| 9 | 15 | 18 |
| 10 | 10 | 17 |
| 11 | 8 | 11 |
| 12 | 18 | 18 |
| 13 | 3 | 13 |
| 14 | 1 | 15 |
| 15 | 1 | 13 |
| 16 | 7 | 12 |
| 17 | 1 | 13 |
| 18 | 0 | 12 |
| 19 | 2 | 17 |
| 20 | 1 | 13 |
| 21 | 4 | 10 |
| 23 | 0 | 12 |
| 24 | 3 | 13 |
| 25 | 20 | 17 |
| 26 | 20 | 17 |
| 27 | 20 | 15 |
| 28 | 21 | 17 |
| 29 | 19 | 16 |
| 30 | 19 | 15 |
| 31 | 18 | 10 |
| 32 | 17 | 14 |
| 33 | 15 | 13 |

TABLE II—Continued

| Compound number | Pre-emergence (20 lb./a.) | Post-emergence (12.5 lb./a.) |
|---|---|---|
| 34 | 17 | 18 |
| 35 | 21 | 18 |
| 36 | 19 | 17 |
| 37 | 21 | 18 |
| 38 | 14 | 13 |
| 39 | 9 | 15 |
| 40 | 15 | 15 |
| 41 | 14 | 14 |
| 42 | 11 | 11 |
| 43 | 12 | 6 |
| 44 | 11 | 12 |
| 45 | 14 | 13 |
| 46 | 19 | 14 |
| 47 | 9 | 12 |
| 48 | 12 | 13 |
| 49 | 6 | 9 |
| 50 | 12 | 17 |
| 51 | 12 | 16 |
| 52 | 7 | 12 |
| 53 | 17 | 18 |
| 54 | 16 | 18 |
| 55 | 16 | 18 |
| 56 | 5 | 11 |
| 57 | 13 | 15 |
| 58 | 21 | 18 |
| 59 | 21 | 18 |
| 60 | 21 | 18 |
| 61 | 21 | 18 |
| 62 | 21 | 18 |
| 63 | 21 | 18 |
| 64 | 21 | 18 |
| 65 | 21 | 18 |
| 66 | 21 | 18 |
| 67 | 20 | 18 |
| 68 | 18 | 18 |
| 69 | 21 | 18 |
| 70 | 21 | 18 |
| 71 | 6 | 13 |
| 72 | 17 | 18 |
| 73 | 15 | 16 |
| 74 | 17 | 16 | the flats were placed in a greenhouse at 70° to 85° C. and watered daily by sprinkling. Two weeks after planting when the seedlings were 2 to 3 inches in height, a foliage spray was applied using the moving belt sprayer in the same way as described above. The rate of application was 2 lbs./acre and the volume of spray solution was 80 gal./acre. The treated plants were placed back in the greenhouse, but care was taken when watering not to wash the applied compound from the foliage. The weed control ratings were recorded two weeks after treatment. An activity index is used here, as described above, in rating the compounds. The results are given in Table III.

TABLE III

| Compound number | Pre- and post-emergence evaluation rate (2 lbs./acre) | | | |
|---|---|---|---|---|
| | Pre-emergence | | Post-emergence | |
| | Gr | Bl | Gr | Bl |
| 72 | 3 | 3 | 4 | 3 |
| 1 | 4 | 3 | 4 | 3 |
| 2 | 3 | 3 | 4 | 3 |
| 3 | 3 | 3 | 4 | 3 |
| 4 | 4 | 3 | 4 | 3 |
| 5 | 2 | 2 | 2 | 3 |
| 7 | 4 | 3 | 4 | 3 |
| 9 | 2 | 3 | 4 | 3 |
| 10 | 0 | 2 | 2 | 3 |
| 12 | 4 | 3 | 4 | 3 |

The following data in Table IV obtained in a similar manner as described above is offered for comparison of the *meta* and *para* analogs. The weed species employed were crab grass (CG), watergrass (WG), mustard (MD) and curled dock (CD). Rating of activity is given as percent weed control at the indicated rate of application.

TABLE IV

| Compound | Rate (lbs./a.) | Percent weed control | | | | | | | |
|---|---|---|---|---|---|---|---|---|---|
| | | Pre-emergence | | | | Post-emergence | | | |
| | | CG | WG | MD | CD | CG | WG | MD | CD |
| *meta*-(N-methylcarbamoyloxy) propionanilide | 2 | 98 | 70 | 100 | 98 | 100 | 90 | 100 | 100 |
| *para*-(N-methylcarbamoyloxy) propionanilide | 20 | 0 | 0 | 0 | 0 | 0 | 0 | 33 | 33 |

Certain compounds shown in Table I were evaluated in both pre- and post-emergence herbicide tests as follows:

Pre-emergence Herbicide Evaluation Test

The seeds of crab grass, foxtail, watergrass, wild oat, pigweed, mustard and curled dock were planted in individual rows one-half inch deep in Santa Cruz sandy loam soil contained in compressed paper flats. The seeds were planted thick enough so that several seedlings emerged per inch of row. The flats were placed in a greenhouse at 70° to 85° C. and watered by sprinkling. One day after planting the flats were sprayed on a moving belt sprayer which was calibrated to apply 80 gallons of spray solution per acre. The candidate compound was applied at a rate of 2 lbs./acre. The flats were returned to the greenhouse after spraying and watered daily by sprinkling. Two weeks after treatment the degree of weed control was estimated and recorded. The percent control was established by comparing to the growth of the same plant species in an untreated control flat of the same age. An activity index is used in Table II which shows the number of grass weeds controlled 75% or more and the number of broadleaf weeds controlled 75% or more. Thus, the maximum index is 4 grass (Gr) weeds and 3 broadleaf (Bl) weeds.

Post-emergence Herbicide Evaluation Test

The seven weed species used in the pre-emergence evaluation test, *supra*, were also used in this test. The seeds were planted in a similar manner. After planting, It can readily be seen in the comparative data of Table IV that the *meta*-substituted compound gives unexpectedly excellent control of the test weed species at 2 lbs./acre as compared to the *para*-substituted compound at 20 lbs./acre.

The compounds of the present invention are used as pre-emergence or post-emergence herbicides and are applied in a variety of ways at various concentrations. In practice the compounds are formulated with an inert carrier, utilizing methods well known to those skilled in the art, thereby making them suitable for application as dusts, sprays, or drenches and the like in the form and manner required. The mixtures can be dispersed in water with the the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½-inch below the soil surface. It is not necesary that the phytotoxic compositions be admixed wtih the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the waer is absorbed therein. Dust compositions, granular compositions or liquid formulations applied on the surface of the soil can be distributed below the surface of the soil by conventional means such as discing, dragging or mixing operations.

Housefly Evaluation Test

The fly specie, *Musca domestica* (Linn.), was subjected to evaluation tests for insecticides incorporating certain of the compounds of the present invention.

Twenty-five female flies, three to five days old, were caged in cardboard mailing tubes 3⅛" in diameter and 2⅝" tall. The cages were supplied with cellophane bottoms and coarse mesh nylon tops. Each cage was provided with food and water. The candidate toxicant was dissolved in a volatile solvent, preferably acetone. The solution was pipetted into a petri dish bottom, allowed to air dry and placed in a cardboard mailing tube cage. The flies were continuously exposed to the known residue of the active compound in the cage. After twenty-four and forty-eight hours, counts were made to determine living and dead insects. The LD$_{50}$ values were calculated using well known procedures.

At the same time, utilizing similar test procedures, several *para*-substituted analogs of the herein disclosed *meta*-alkylamidophenyl N-methyl carbamates were subjected to the housefly evaluation test. This data is also listed in the following table, Table III, for comparative purposes.

TABLE III

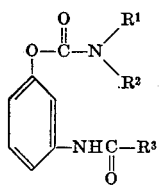

| Compound number | Alkanilide position | R¹ | R² | R³ | Housefly, LD-50 (g.) |
|---|---|---|---|---|---|
| 71 | meta | H | Methyl | Methyl | 5 |
| 72 | do | H | do | Ethyl | 3.5 |
| 73 | do | H | do | Isopropyl | 10 |
| 74 | do | H | do | n-Propyl | 3.5 |
| A | para | H | do | Methyl | 500 |
| B | do | H | do | Ethyl | 500 |
| C | do | H | do | Isopropyl | 10,000 |
| D | do | H | do | n-Propyl | 10,000 |

From these data it can be readily seen that the *meta*-substituted compounds of the present invention are valuable insecticides. Surprisingly and unexpectedly the *meta*-substituted compounds 71, 72, 73 and 74 are superior in activity over the analogous *para*-substituted derivatives of A, B, C and D, respectively.

It was also found that m-(N-methylcarbamoyloxy) acetanilide effectively controlled lygus bug at 0.08 percent concentration. These sucking insects are serious economic threat to many crops. Recently it has been noted they are becoming more tolerant to DDT, therefore, control has become increasingly difficult. The find of an effective agent to control these insects is very valuable.

From these data it can be seen that certain of the compounds of the present invention are valuable as insecticides. In practice, the compounds are usually formulated with an inert adjuvant, utilizing methods well known to those skilled in the art, thereby making them suitable for application. They may be used in the form of emulsions, non-aqueous solutions, wettable powders, vapors, dusts, dips and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon.

The concentration of a compound of the present invention, constituting an effective amount in best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound of the formula

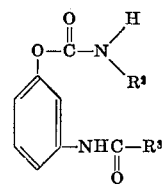

in which R² is selected from the group consisting of phenyl and substituted-phenyl wherein said substituents are selected from the group consisting of lower alkyl having 1 to 6 carbon atoms, halogen, lower alkoxy and nitro, and R³ is alkyl having from 1 to 6 carbon atoms, inclusive.

2. A compound according to Claim 1 in which R² is 2-methylphenyl and R³ is ethyl.

3. A compound according to Claim 1 in which R² is 3-methylphenyl and R³ is ethyl.

4. A compound according to Claim 1 in which R² is 4-methylphenyl and R³ is ethyl.

5. A compound according to Claim 1 in which R² is 2-chlorophenyl and R³ is ethyl.

6. A compound according to Claim 1 in which R² is 3-chlorophenyl and R³ is ethyl.

7. A compound according to Claim 1 in which R² is 4-chlorophenyl and R³ is ethyl.

8. A compound according to Claim 1 in which R² is 3,4-dichlorophenyl and R³ is ethyl.

9. A compound according to Claim 1 in which R² is 2,5-dichlorophenyl and R³ is ethyl.

10. A compound according to Claim 1 in which R² is 4-bromophenyl and R³ is ethyl.

11. A compound according to Claim 1 in which R² is 3-nitrophenyl and R³ is ethyl.

12. A compound according to Claim 1 in which R² is 4-ethoxyphenyl and R³ is ethyl.

13. A compound according to Claim 1 in which R² is phenyl and R³ is methyl.

14. A compound according to Claim 1 in which R² is phenyl and R³ is isopropyl.

15. A compound according to Claim 1 in which R² is phenyl and R³ is ethyl.

References Cited

FOREIGN PATENTS 554,576    3/1958    Canada _____ 260—482
6403519   10/1964    Netherlands _____ 260—482

LORRAINE A. WEINBERGER, Primary Examiner

P. J. KILLOS, Assistant Examiner

U.S. Cl. X.R.

71—106, 111; 260—463, 468 E, 479 C; 424—300